G. F. ROBERTS.
WIPER FOR SPINNING MACHINES.
APPLICATION FILED JULY 13, 1917.
1,256,040.
Patented Feb. 12, 1918.
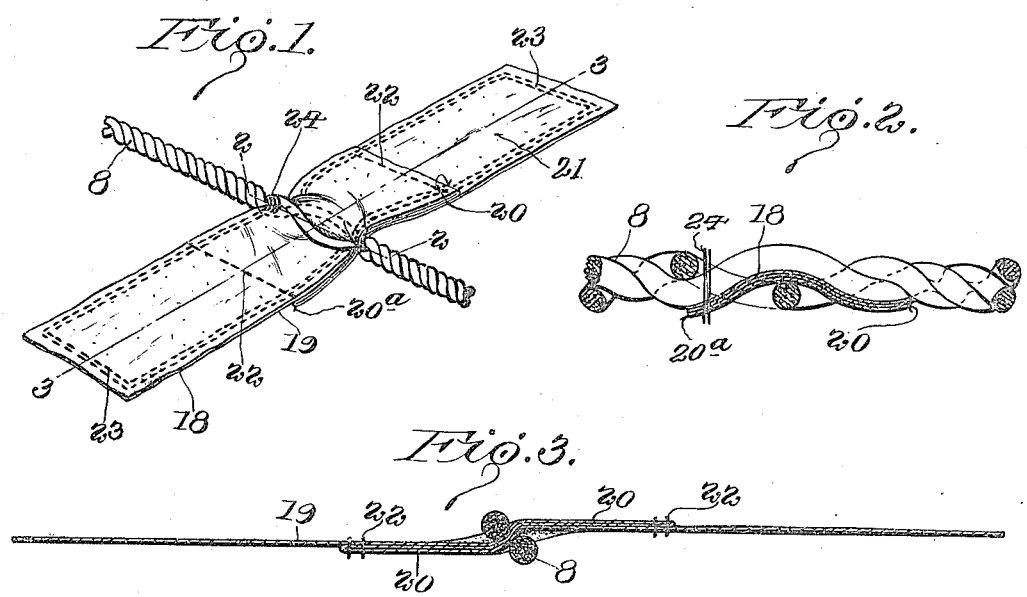
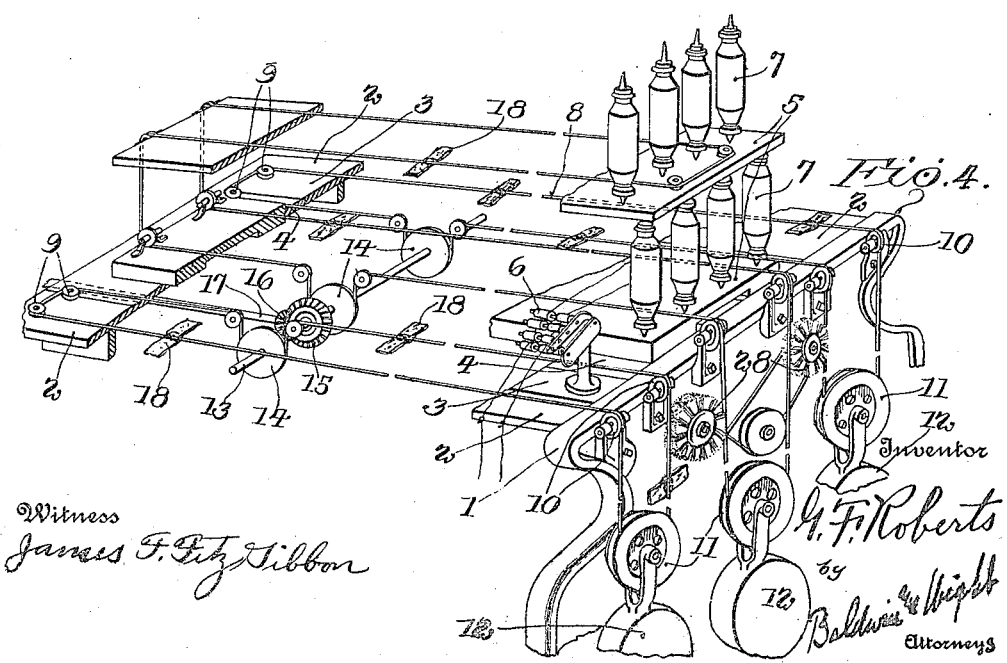
Witness
James F. Fitz Gibbon
Inventor
G. F. Roberts
by
Baldwin & Wright
Attorneys

UNITED STATES PATENT OFFICE.

GUS FRANKLIN ROBERTS, OF BELTON, SOUTH CAROLINA, ASSIGNOR TO TEXTILE SPECIALTY COMPANY, OF BELTON, SOUTH CAROLINA, A CORPORATION OF SOUTH CAROLINA.

WIPER FOR SPINNING-MACHINES.

1,256,040.  Specification of Letters Patent.  Patented Feb. 12, 1918.

Application filed July 13, 1917.  Serial No. 180,424.

*To all whom it may concern:*

Be it known that I, GUS F. ROBERTS, a citizen of the United States, residing at Belton, in the county of Anderson and State of South Carolina, have invented certain new and useful Improvements in Wipers for Spinning-Machines, of which the following is a specification.

This invention relates to certain new and useful improvements in cleaning devices for spinning machines and the like, and contemplates more especially an improvement over that form of combined wiper and cleaning cord disclosed in United States Letters Patent No. 1,129,312, granted to me February 23, 1915.

The invention aims to provide improved means for removing the accumulation of lint from the frames of spinning machines and particularly the thread-boards, roller beams, back boards, and creels thereof.

The primary object is improved means for attaching the wipers to the cord, and a further object is to sufficiently reinforce and stiffen the wipers for maintaining a full and uniform sweep of the space to be cleaned.

In the accompanying drawings:

Figure 1 is a perspective view of a portion of the endless cleaning cord having attached thereto a wiping member which is stiffened or reinforced a distance on each side of the cord, as shown.

Fig. 2 is a longitudinal sectional view on the line 2—2 of Fig. 1.

Fig. 3 is a transverse sectional view on the line 3—3 of Fig. 1.

Fig. 4 is a fragmentary perspective view of a spinning machine, illustrating the manner in which the plurality of endless cleaning cords and wipers are tensioned and driven on the thread-boards and creels.

The improved cleaning device, and more especially the endless cord and attached wiping members, have been designed to overcome certain difficulties which have been experienced in using that form of cleaning cord disclosed in my patent hereinbefore referred to. It has been found from practice that the endless cord continuing to move in one direction sometimes causes the wipers, which are made of flannel or other suitable material, to droop rearwardly and ultimately lie substantially close to or hug the cord, thereby reducing the width of the path of travel and as a result the extent of the surface to be cleaned. The use of this form of cleaning wiper requires frequent change, occasioning necessarily the stopping of the machine and the introducing of another set of cleaning wipers at an increased expense.

I avoid this waste by reinforcing the projecting wipers so as to maintain a substantially uniform path of travel and thereby clean a corresponding predetermined surface of the machine. The reinforcing of the wiping members I accomplish by stiffening the laterally extending ends of the wipers for a distance on each side of the cord. In the form herein shown, the wiper is doubled back on itself at its intermediate portion thereby forming an increased thickness of the material. The stiffening of the wiper may also be accomplished by otherwise increasing the ply of the material at its central portion.

The positioning of the wiper upon the cord or rope also produces added advantages of commercial value, in that the wiper is preferably interposed between the strands of the rope, as shown. In the use of a two-strand rope the strands may be untwisted and the wiper can be readily inserted therebetween and stitched at one end to guard against any tendency to work loose. The manner of attaching the wiping members to the cord can be varied and I do not care to limit myself to the exact manner herein set forth.

Referring to the drawing, the general type of spinning machine to which my invention is applied comprises the usual frame 1 on which are supported the thread-boards 2, roller beams 3, back boards 4, and double creel 5. The drawing rolls are indicated at 6 and the roving bobbins are shown at 7. This form of spinning machine is well known in the art and a further detail description thereof is not deemed necessary.

The cleaning devices are positioned upon the machine in groups and are adapted to clear the respective surfaces over which they pass of all lint and other foreign substances. Inasmuch as these several cleaning devices are similar in construction and operation a description of but one group only will be given. The endless cords or ropes 8 are designed to traverse a surface of the spinning machine including the thread-boards, roller beams, and back boards, in such a manner that the spaces between the cords will be cleaned, as well as the surfaces beyond the sides of the parallel cords. The endless cord 8 passes lengthwise of the machine, around guide pulley 9, horizontally disposed at one end of the machine, and thence in the opposite direction and downward over vertically arranged pulley 10, and around a weighted tensioning pulley 11 as shown. The pulley 11 is suspended on the looped end of the cord and carries the weight 12. By this construction the relative tautness of the cord is always maintained. Each group of cleaning devices is provided with the guiding pulleys and weighted tensioning device.

The endless cords are driven from a common drive shaft 13 transversely positioned beneath the bed of the machine. Driving pulleys 14 are provided on the shaft 13 and interrupt the horizontal path of travel of the cords which are adapted to pass around said drive pulleys and receive motion therefrom.

Power is transmitted to the drive shaft 13 through bevel gears 15 and 16, the latter of which is rotated by the shaft 17 suitably driven from any source of power connected to the machine, as will be readily understood.

The cords or ropes are preferably formed of twisted strands and for the purposes herein shown I employ a two-strand rope twisted in the usual manner. The wiping members 18 are readily attached to the cord 8 preferably between the strands thereof. The material from which the wipers 18 are made may be of flannel or other suitable material, which readily collects lint and at the same time maintains uniform projecting stability with respect to the surface over which it sweeps. The form of wiper shown in Fig. 1 of the drawings includes a strip of fabric 19 bent back or doubled upon itself, as at 20, and extended beneath the main portion 19 to the point 20ª and there bent upon itself again and continued to form the projecting portion 21. The double backed portions are stitched as at 22. I also provide stitching 23 along the single ply and treble ply portions to prevent raveling. Thus there are provided the multiply portion engaging the cord and extending an effective distance in both directions from the cord, and the single ply or less rigid extremities 19 and 21.

In attaching the wiper to the cord the strands of the cord are separated and the strip of fabric interposed therebetween and the strands twisted again, as clearly shown in Figs. 1, 2 and 3 of the drawings.

The relative strength of the twisted strands of the cord is usually sufficient to hold the fabric wiper in place, but in addition to this I provide stitching 24 at the front or leading edge of the wiper, as shown. From this construction of wiping member it will be apparent that I have produced a relatively stable and yet sufficiently flexible cleaning wiper for the purposes to which it is subjected.

The usual means for removing the lint from the wipers may be incorporated in the cleaning devices, and as shown comprises the brushes 28 located on one side of the machine in the path of travel of the said wipers. These brushes can be operated in any well known manner.

From the foregoing it will be obvious that I have produced an improved cleaning device for spinning machines and the like, and more especially an efficient and relatively durable wiping member, capable of maintaining a substantially uniform sweep of the surface over which it travels, and correspondingly economical in the saving of time that it takes to replace same.

I claim as my invention:

1. The combination with a cleaning cord, of a flexible cleaning wiper secured thereto and adapted to travel at all times in unison with the cord, said wiper having an S-shaped fold formed therein for reinforcing the same and maintaining the ends thereof in a predetermined projecting position from the sides of the cord.

2. The combination with a cleaning cord, of a cleaning wiper secured thereto and adapted to travel at all times in unison with the cord, said wiper having a central multiply portion for reinforcing the same at its point of attachment to the cord and maintaining the ends thereof in a predetermined projecting position from the sides of the cord, and means for securing the plies together to stiffen the same and prevent raveling of the wiper.

3. The combination with a multi-strand cleaning cord, of a cleaning wiper secured between the strands of said cord and adapted to travel at all times in unison with the cord, said wiper having an extended central reinforced portion at its point of attachment to the cord for maintaining the ends thereof in predetermined projecting relation to the sides of the cord.

In testimony whereof, I have hereunto subscribed my name.

GUS FRANKLIN ROBERTS.